E. L. RUGG.
Farm-Gate.
No. 214,319. Patented April 15, 1879.
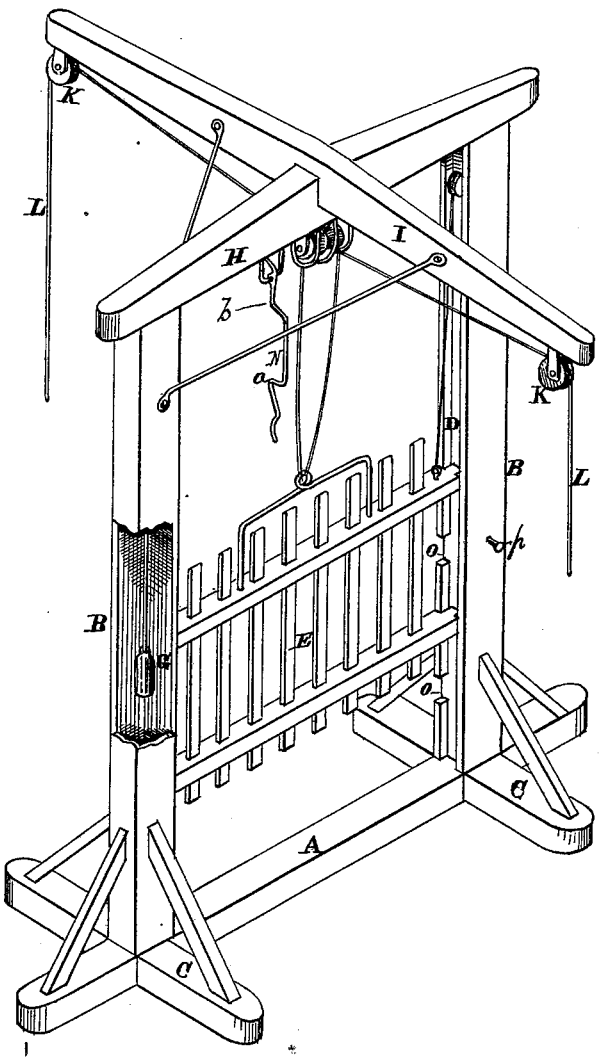

UNITED STATES PATENT OFFICE

EARLE L. RUGG, OF CAPAY, CALIFORNIA.

IMPROVEMENT IN FARM-GATES.

Specification forming part of Letters Patent No. 214,319, dated April 15, 1879; application filed December 16, 1878.

*To all whom it may concern:*

Be it known that I, EARLE L. RUGG, of Capay, county of Yolo, and State of California, have invented a Farm-Gate; and I hereby declare the following to be a full, clear, and exact description thereof, reference being had to the accompanying drawings.

My invention relates to vertically-sliding gates; and it consists in a gate sliding vertically in grooves in two upright posts, the groove in one post having transverse slots in its lower portion, whereby the cross-bars of the gate may be pushed out and the gate swung horizontally to allow the passage of high loads of hay and other articles.

The sill A is embedded in the ground so as to be even with the surface, and extends out somewhat past the uprights B, so that braces may extend from it to the uprights. Cross-sills C run under the uprights at right angles to the main sill, on which are braces extending to the uprights, as shown. The upright posts B have longitudinal grooves D formed in them, in which the gate E slides, and grooves F are formed in their outer sides, in which swing the weights G, which balance the gate. The weights and gate are connected by ropes passing over pulleys in the top of the uprights, said weights being almost sufficient to balance the gate.

A beam, H, connects the two uprights at their upper ends, and across the center of this, at right angles, is placed the cross-beam I. This cross-beam has a small pulley, K, at either extremity, through which pass the ropes L, which raise the gate. These ropes L pass upward from the center of the top of the gate over pulleys M, fastened to the under side of the beam H at its central point, and thence run along the under side of the cross-beam to the single pulley, so as to hang down from the end of said cross-beam at a suitable distance from the gate.

A peculiarly-shaped hook or catch, N, is hung loosely from the center beam, H, so as to swing freely, and is so arranged as to hold the gate when it is raised to the proper position. The catch N is turned at right angles at its lower portion, as shown at *a*, and this right-angled portion serves to hold the gate in its elevated position by catching under the top bar of the gate. The upper part of the catch has an inclined bend, *b*, which serves to throw the catch out by the top bar of the gate or rod, to which the rope is attached, striking against this inclined portion and throwing the catch back, so that the gate is allowed to descend On the hook being released the gate will slide down to its closed position, its weight being sufficient for it to overcome the gravity of the balance-weights.

Slots O, corresponding in position with the rails of the gate, are cut in one of the uprights to allow the gate to be swung out of the frame whenever necessary, or to be swung open as an ordinary gate, and a pin, *p*, serves to fasten the weight-rope to, so as to prevent it getting out of reach when the gate is swung back. In this way, when there is a high load on the wagon which would not pass under the gate when raised, the gate may be swung back in the ordinary manner.

To operate my gate, the person desiring to open it draws down on one of the cords leading from the top of the gate up to the pulley at the end of the cross-beam. This raises the gate up, the weights assisting in the operation, and when at the proper height the catch or hook catches under the upper bar of the gate and holds it in the suspended position. After the vehicle has passed through, the driver gives a short smart pull upon the opposite rope, letting go suddenly, so as to allow the gate to descend quickly past the hook. By pulling on the rope in this manner, the hook is thrown suddenly back, its peculiar form assisting in the action, by the top bar of the gate or rod, to which the lifting-rope is fastened, striking against the upper bend of the hook. In this way the gate may be closed without trouble, the holding-hook being adjusted by the same power that raises the gate.

Having thus described my invention, what I claim as new, and desire to secure by Letters Patent, is—

The improvement in gates, consisting of the vertical guide-posts B, having the slots O in one side, in combination with the rigid gate-frame E, with its suspending-ropes L, one of which is made detachable from the gate, whereby the gate may be made to slide up or down in the guides, or be swung open upon one of the ropes as a hinge, substantially as herein described.

In witness whereof I have hereunto set my hand.

EARLE L. RUGG.

Witnesses:
ED. E. PERKINS,
JOHN A. LANG.